Sept. 16, 1924.
A. P. DAVIS
COMPASS
Filed March 18, 1919   2 Sheets-Sheet 2
1,508,875
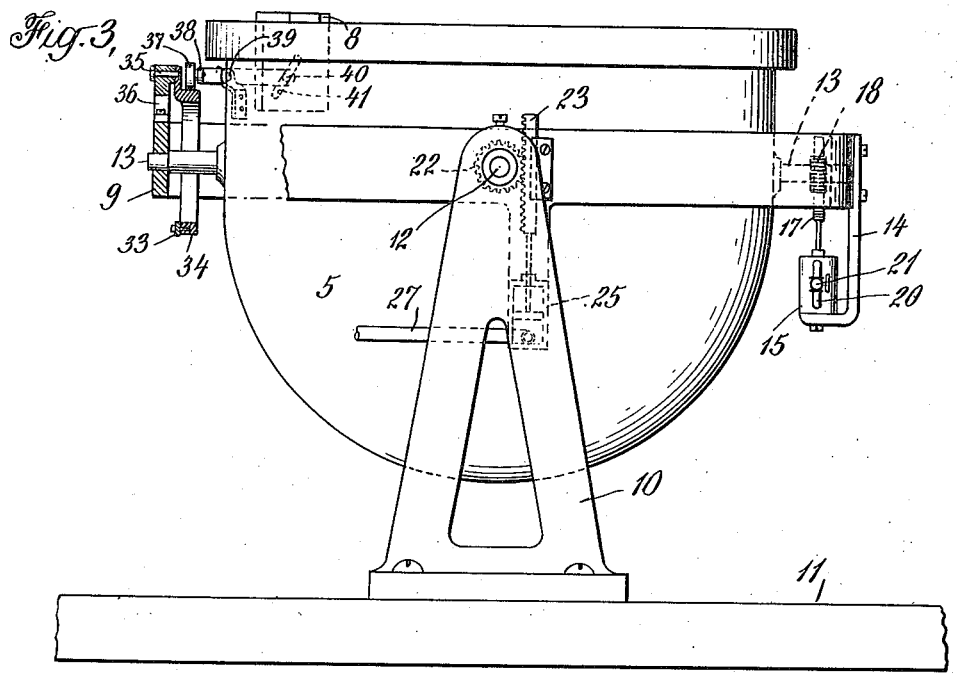
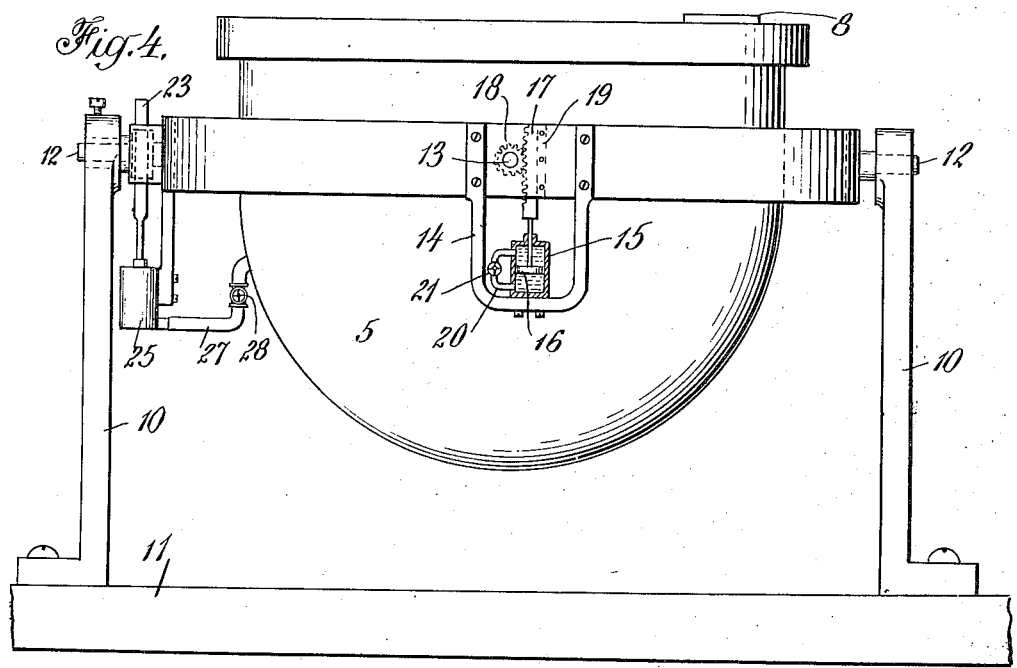
INVENTOR
A. P. Davis,
BY
ATTORNEYS.

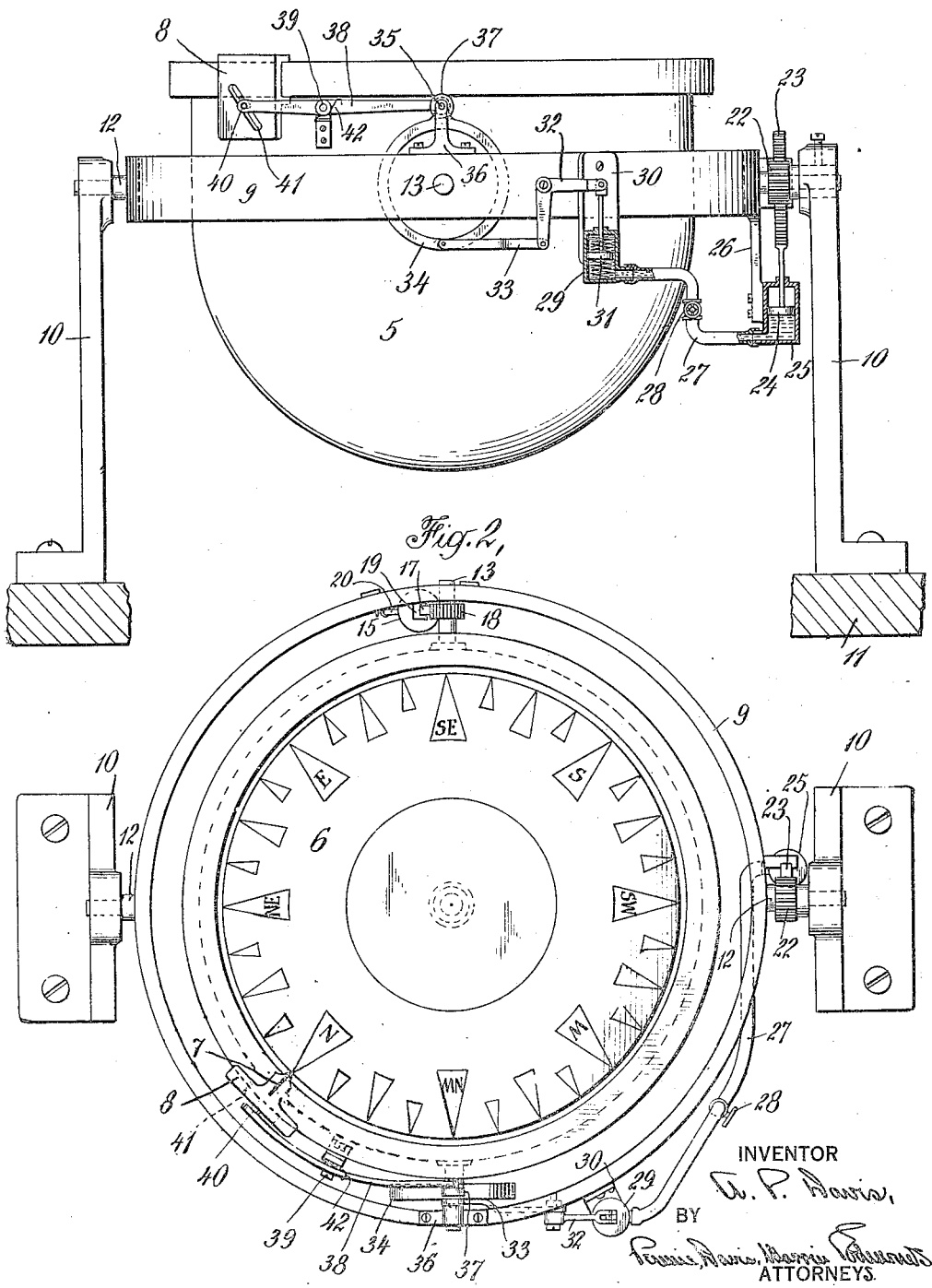

Patented Sept. 16, 1924.

1,508,875

UNITED STATES PATENT OFFICE.

ARTHUR P. DAVIS, OF BROOKLYN, NEW YORK.

COMPASS.

Application filed March 18, 1919. Serial No. 283,382.

*To all whom it may concern:*

Be it known that I, ARTHUR P. DAVIS, a citizen of the United States, residing at Brooklyn, in the county of Kings, State of New York, have invented certain new and useful Improvements in Compasses; and I do hereby declare the following to be a full, clear, and exact description of the invention, such as will enable others skilled in the art to which it appertains to make and use the same.

This invention relates to ships' compasses of the type in which the compass proper is mounted for universal movement so that the compass card will maintain horizontality throughout rolling and pitching movements of its support. The invention is directed to the provision of certain improvements in the construction of such instruments whereby greater accuracy and reliability are secured. The invention is applicable to compasses of various types, as for instance both magnetic and gyroscopic compasses.

One of the features of the invention involves the provision of means for eliminating certain errors which, though usually small in magnitude, sometimes assume substantial magnitude and importance and which hitherto have not been recognized and appreciated. The errors referred to are those arising from the changing relation of the ship's plane and that of the compass card, resulting in shifting the position of the reference or lubber's line of the compass.

The movements of a ship in the water, other than its forward movement, are usually termed "pitching," "rolling" and "yawing," pitching being an angular movement of the longitudinal axis in a plane approximating the vertical, and rolling being a movement about the longitudinal axis. As these movements of the ship take place, the compass moves in its universal mounting so that the compass card remains horizontal. In order that the pitching and rolling motions of a ship shall have no effect upon the readings of the compass, the plane of pitching and the axis of rolling should be maintained in their original or normal relation to the compass card. But as a matter of fact, pitching does take place in a vertical plane irrespective of whether or not the ship is on an even keel and rolling occurs about a more or less inclined axis depending on the pitch at that instant and these movements give rise to errors causing angular displacement of the position of the reference or lubber's line. Otherwise stated, when either rolling or pitching occurs alone, no error due to shift in the position of the reference line occurs because the movement of the compass in its universal mounting is a simple one about a single axis. But when both pitch and roll occur simultaneously, movement of the compass takes place about the two axes at right angles to each other and an angular shift of the reference line occurs. Thus in the case of a ship rolling about an axis inclined to the horizontal, a component of the rolling motion appears about a vertical axis and causes an apparent shifting of the reference line of the compass although the ship has not suffered any actual change of course. And in the extreme case of a pitch through ninety degrees, carrying the longitudinal axis of the ship to a vertical position, followed by a roll about this vertical axis, the reference line would be carried around the full amount of the angle of roll. In all such cases of simultaneous roll and pitch, the magnitude of the angular displacement of the reference line is equal to the angle of roll multiplied by the sine of the angle of pitch. This displacement may be on either side of the true position, that is, may be either plus or minus, and it should be noted that when a roll and pitch causing a plus displacement are simultaneously reversed, the displacement error would still be plus.

One object of this invention is the elimination of this error and this is accomplished by the provision of means for effecting an angular shift of the position of the lubber's line of the compass in accordance with simultaneous rolling and pitching movements of the ship, that is rolling movements when the ship's axis is inclined to the horizontal and pitching movements when the ship is not on an even keel. This angular displacement of the lubber's line is effected automatically by the movements of the compass proper in its universal mounting and the means for effecting it is so constructed that the amount of displacement is always equal to the angle of roll multiplied by the sine of the angle of pitch.

Another feature of the invention involves the provision of improved means for reducing or preventing oscillations of the compass in its pivotal supports as the angular position of the ship changes during rolling, pitching and yawing. Friction devices have heretofore been proposed for accomplishing this but they are not well adapted for the purpose, particularly because they offer the maximum resistance at the beginning of the relative movement of the parts thereof and a materially decreased resistance as the movement progresses. In accordance with this invention, the means for reducing or preventing the oscillations is of such a nature that it offers resistance which is proportional to the rate at which the relative movement takes place and it consists of a dash-pot or similar device in which the displacement of a fluid is utilized to provide the resistance required for reducing or preventing oscillation.

These two features of the invention may be utilized together by employing the fluid displaced in checking oscillation of the compass in its support to effect the displacement of the lubber's line of the compass in accordance with simultaneous rolling and pitching motions of the ship. A construction whereby this may be accomplished is indicated in the accompanying drawings but it should be understood that this construction is illustrated and described only in making the principles of the invention clear and that those principles may be employed for accomplishing the purposes of the invention in constructions which differ widely as to the instrumentalities employed and their structural characteristics.

In these drawings, Fig. 1 is an elevation of a compass and its mounting, certain of the parts relating more particularly to this invention being shown in vertical section; Fig. 2 is a plan view of the apparatus shown in Fig. 1; Fig. 3 is an end elevation of the apparatus, certain of the parts being shown in section, and Fig. 4 is a view corresponding to Fig. 1 but showing the other side of the compass.

Referring to these drawings, a compass is indicated at 5. It may be of any character and of any construction. For instance, it may be a magnetic compass or a gyroscopic compass. The bowl-shaped member 5 illustrated in the drawings and the compass card 6 therein are intended merely as diagrammatic representations of any form of ship's compass. The compass is provided with a reference or lubber's line 7 as usual. The member on which this lubber's line appears is movable upon the frame of the compass. In the present instance this lubber's line is shown as marked upon a bracket or sliding plate 8 which embraces the frame or rim of the bowl of the compass 5 and may be moved thereon angularly about the vertical axis of the compass.

The compass 5 is mounted in a universal or gimbal mounting as is usual so that it may turn in any direction to maintain horizontality of the compass card 6. This universal or gimbal mounting is shown as consisting of a gimbal ring 9 in which the compass 5 is pivotally mounted and which is pivoted upon standards 10 rising from a suitable supporting structure 11 which would ordinarily be a portion of a ship. The standards 10 are provided with stationary trunions or pivot pins 12 which are received in bearings carried by the gimbal ring 9. The gimbal ring is also provided with bearings for the reception of trunnions 13 on the compass 5, the two axes of the turning movement of the compass 5 on the trunnions 13 and 12 being at right angles to each other.

In order to suppress oscillation of the compass in its universal mounting, means are provided for requiring that turning-movement of the compass on its pivots must affect displacement of a fluid. Friction devices have been employed for this purpose heretofore but such devices are unsatisfactory for the reason that they present the greatest resistance to turning movement of the compass at the start of that movement when the friction surfaces are relatively stationary and a greatly decreased resistance after relative movement has begun. With fluid displacing means, on the other hand, the resistance to movement varies with the rate of the movement, and adjustment of the magnitude of the resistance may be effected quite readily. The fluid displacing means for suppressing oscillations is, therefore, far more satisfactory. The devices for suppressing oscillation about one of the two axes are best illustrated in Figs. 3 and 4. A bail 14 is provided secured to and depending from the gimbal ring 9 and carries a cylinder 15 provided with a piston 16. The rod of this piston is connected to a rack 17 which meshes with a pinion 18 on one of the trunnions 13. A guide 19 secured to the gimbal ring 9 holds the rack 17 in position in mesh with the pinion 18. Opposite ends of the cylinder 15 are connected by a by-pass 20 in which is a valve 21 by which the freedom of flow of the liquid through the by-pass may be regulated as desired.

It will be noted that when the compass 5 turns about the axis of the trunnions 13 the pinion 18 secured to one of those trunnions will cause the rack 17 to move upward or downward, thus moving the piston 16 in the cylinder 15 and displacing the fluid in the cylinder 15 from one end to the other of the cylinder through the by-pass 20. Oscillation of the compass about the axis of the trunnion 13 is, therefore, reduced or prevented, and the extent to which oscillation will be suppressed may be varied by adjusting the position of the valve 21.

This same or similar fluid displacing means for suppressing oscillation may be employed in connection with the other axis of rotation of the universal mounting. However, in connection with one of the axes of the universal mounting, I prefer to employ the fluid displacing means for accomplishing functions additional to that of suppressing the oscillation and this will now be described.

One of the stationary trunnions 12 has a pinion 22 secured thereon and meshing with a rack 23 which is mounted upon the gimbal ring 9 to permit it to move in a direction transverse to the plane of the ring. The end of this rack is connected to a piston 24 moving in a cylinder 25 which is mounted upon the gimbal ring by means of a depending arm 26. The lower end of the cylinder 25 is connected by a tube 27 provided with a valve 28 to the lower end of a second cylinder 29 which is also mounted on the gimbal ring 9 by means of a depending arm 30. Within this cylinder 29 is a piston 31 whose end is pivotally connected to one end of a bell crank 32; the other end of this bell crank is connected by a link 33 to a ring 34. This ring 34 is pivotally mounted to turn about an axis 35, the pivot pin on which the ring is mounted being carried by a standard 36 mounted on the gimbal ring 9. The ring 34 surrounds one of the trunnions 13 but the opening through the ring is of considerably greater size than the trunnion 13 and therefore the ring may be turned about its axis 35 through an angle approximating 45° on either side of the normal position in which it is shown in Fig. 1. A roller 37 runs on the periphery of the ring 34. This roller is carried by a lever 38 pivotally mounted at 39 upon the bowl of the compass. At its end the lever 38 carries a pin 40 which enters an inclined slot 41 in the plate or member 8 on which the reference or lubber's line 7 is drawn. A spring 42 bears on the lever 38 to hold the roller 37 always in contact with the periphery of ring 34.

It will be noted that with the parts in the positions illustrated in Fig. 1 with the ring 34 concentric with the trunnion 13, when the compass 5 turns in its universal mounting about the axis 13 only, the lever 38 is not turned on its axis 39 at all. The roller 37 merely runs around on the periphery of the ring 34 traveling in a path concentric with the axis of rotation 13.

It will be noted further that with the parts in the positions shown in Fig. 1, the ring 34 may be turned about its axis of rotation 35 in either direction without causing any turning movement of the lever 38 about its pivot 39 for the axis 35 about which the ring 34 turns is concentric with the roller 37. Such turning movement of the ring 34 about the axis 35 occurs whenever the compass and its gimbal ring 9 turn about the axis of the trunnions 12 for then the rack 23 is moved lengthwise by its coaction with the stationary pinion 22, the piston 24 is moved in the cylinder 25 and liquid flows through the pipe 27 in one direction or the other, causing movement of piston 31 corresponding to that of piston 24 and the movement of piston 31 is transmitted to the ring 34 through the parts 32 and 33.

It will be noted, therefore, that in the case of turning movement of the compass in its gimbal mounting about either one of the two axes, unaccompanied by movement about the other axis, no bodily movement of roller 37 takes place and no turning movement of lever 38 about the axis 39 occurs. But if the compass turns in its gimbal mounting about both axes 12 and 13, the lever 38 will be turned on its axis 39 and such movement of the lever will cause the plate 8 with the lubber's line to be moved angularly about the vertical axis of the compass by reason of the coaction of the pin 40 on the lever 38 and the inclined slot 41 in the plate 8. Thus, if the compass turns about the axis of the trunnion 12, this will cause movement of the ring 34 about axis 35 to one side or the other; then if the compass turns about the axis 13 while the ring 34 is so displaced from its normal position, the travel of the roller 37 around upon the periphery of ring 34 incident to this turning movement of the compass about axis 13 will cause the roller 37 to be moved toward or away from the axis 13, resulting in turning movement of lever 38 about axis 39 and movement of the plate 8 angularly about the vertical axis of the compass.

The compass would be so mounted on a ship that pitch of the ship would cause the compass to turn in its gimbal mounting about the axis 13, and rolling would cause it to turn about the axis 12. In such case, a movement of plate 8 about the vertical axis of the compass would not be effected by pitching unaccompanied by rolling or rolling unaccompanied by pitching; but when rolling and pitching occur simultaneously, that is, when rolling occurs while the longitudinal axis of the ship is displaced from the horizontal or when pitching occurs while the ship is not on an even keel, the plate 8 will be displaced. The amount of this displacement will be proportional to the product of the angle of roll and the sine of the angle of pitch. The mechanism above described and indicated by the references 29 to 41 inclusive, may be considered a mechanism for determining the product of the angle of roll and the sine of the angle of pitch and moving the member 8 carrying the reference line around about the vertical axis of the compass an amount corresponding to that product. Any mechanism which will perform this function may be employed for effecting the purpose of the invention. By so moving the lubber's line continuously and automatically in accordance with simultaneous rolling and pitching of the ship, an error is eliminated which has been present in the constructions heretofore employed growing out of the fact that when the ship rolls while its longitudinal axis is inclined, or when it pitches while it is not on an even keel, a component of the motion of the part on which the lubber's line is marked appears around a vertical axis, causing an apparent displacement of the position of the lubber's line although there has been no actual change in the course of the ship. The actual operation of the compass is in no way responsible for this error which is due solely to the changes in the positions of the axes of pitching and rolling while the plane of the compass card remains unchanged. The magnitude of this error with the constructions heretofore employed changes almost continuously in practical work, though it will be noted that if the conditions of pitch and roll which give rise to the error were simultaneously reversed, as might readily occur in the case of a ship proceeding in a quartering sea, the error would be of the same sign, that is, the lubber's line would continue to be displaced on the same side of the true position. By means of the mechanism herein described, or any similar mechanism for determining the product of the angle of roll and the sine of the angle of pitch and moving the lubber's line in accordance with this product automatically, that line will always be in its true position and the error above referred to will be eliminated.

It will be understood that when the invention is employed in connection with a master gyroscopic compass which is not used for direct reading but only for operating repeaters at which readings are made, the repeaters and not the master would be provided with lubber's lines and these lubber's lines on the repeaters would be shifted as herein described.

I claim:

1. The combination of a compass, a support, a universal mounting between the support and compass whereby the compass does not partake of the rolling and pitching motion of the support, a movable member associated with said compass and bearing the reference line therefor, and means controlled by the relative movement of the universal mounting, compass and support, to displace said member in accordance with combined rolling and pitching motions of said support.

2. The combination of a compass, a support, a gimbal mounting between the support and compass permitting the compass to turn about axes at right angles to each other whereby the compass does not partake of the rolling and pitching motion of the support, a movable member carried by said compass and bearing the reference line therefor, and means controlled by the relative movement of said compass, mounting and support, to displace said member with respect to said compass in accordance with combined rolling and pitching motions of said support.

3. The combination of a compass, a support, a universal mounting between the support and compass whereby the compass does not partake of the rolling and pitching motion of the support, a movable member associated with said compass and bearing the reference line therefor, and means controlled by the relative movement of the compass, universal mounting and support to displace said member in accordance with combined rolling and pitching motions of said support, said means including a fluid connection, a fluid therein, and means responsive to the relative movement between two parts of the apparatus for displacing said fluid.

4. The combination with a compass adapted to be mounted on a ship and having a universal mounting and a movable member bearing a reference line, of automatic means actuated by the relative movement of the compass and its mounting for effecting displacement of the movable member when rolling and pitching of the ship take place simultaneously but not when the ship rolls while its longitudinal axis is horizontal or when pitching takes place while the ship is on an even keel.

5. The combination with a compass having a universal mounting and a member bearing a reference line, of a cylinder containing a fluid, a piston movable in the cylinder to displace the fluid therein, means actuated by the relative movement of the compass and its mounting for effecting a relative movement of the piston and its cylinder, and means actuated by the displaced fluid and serving to effect a displacement of the member bearing a reference line in accordance with rolling and pitching motions of the supporting structure on which the compass is mounted.

6. The combination of a compass, a support, a universal mounting between the support and compass whereby the compass does not partake of the rolling and pitching motion of the support, a movable member associated with said compass and bearing the reference line therefor, and means controlled by the relative movement of the compass, universal mounting and support to displace said member in accordance with combined rolling and pitching motions of said support, the said means including a damping device for suppressing the relative movement between two parts of the apparatus.

7. The combination of a compass, a gimbal mounting therefor permitting the compass to turn about axes at right angles to each other, a member having a reference line thereon, a cylinder containing a fluid, a piston movable in the cylinder to displace the fluid therein, means actuated by relative movement of the compass and its mounting for effecting relative movement of the piston and its cylinder and displacing the fluid within the cylinder and means operated by the displacement of said fluid for moving said member having a reference line thereon about the axis of the compass.

In testimony whereof I affix my signature.

ARTHUR P. DAVIS.